US010789275B2

(12) United States Patent
Gordon

(10) Patent No.: US 10,789,275 B2
(45) Date of Patent: Sep. 29, 2020

(54) SYSTEMS AND METHODS FOR PROVIDING CONTENT

(71) Applicant: Facebook, Inc., Menlo Park, CA (US)

(72) Inventor: Taylor Gordon, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 284 days.

(21) Appl. No.: 15/362,454

(22) Filed: Nov. 28, 2016

(65) Prior Publication Data

US 2018/0150545 A1 May 31, 2018

(51) Int. Cl.
*G06F 16/28* (2019.01)
*H04L 29/06* (2006.01)
*H04L 29/08* (2006.01)
*G06F 16/41* (2019.01)

(52) U.S. Cl.
CPC ............ *G06F 16/285* (2019.01); *G06F 16/41* (2019.01); *H04L 63/102* (2013.01); *H04L 67/06* (2013.01); *H04L 67/22* (2013.01)

(58) Field of Classification Search
CPC ........... G06F 17/30598; G06F 17/3002; G06F 17/30601; G06F 16/285; G06F 16/41; H04L 63/00; H04L 67/06; H04L 67/22; H04L 63/102
See application file for complete search history.

(56) References Cited

U.S. PATENT DOCUMENTS

| | | | | |
|---|---|---|---|---|
| 7,970,820 | B1 * | 6/2011 | Sivasubramanian | ... H04L 67/06 709/203 |
| 2006/0129502 | A1 * | 6/2006 | Pastusiak | ................ G06F 21/10 705/71 |
| 2013/0104249 | A1 * | 4/2013 | Cakulev | .............. H04L 67/1063 726/30 |
| 2014/0304384 | A1 * | 10/2014 | Varenhorst | .............. H04L 67/00 709/223 |
| 2015/0227624 | A1 * | 8/2015 | Busch | ............... G06F 16/90339 707/728 |
| 2016/0164680 | A1 * | 6/2016 | Liao | ...................... H04W 12/04 713/155 |

* cited by examiner

*Primary Examiner* — Robert W Beausoleil, Jr.
*Assistant Examiner* — Mohammad Solaiman Bhuyan
(74) *Attorney, Agent, or Firm* — Sheppard Mullin Richter & Hampton LLP

(57) ABSTRACT

Systems, methods, and non-transitory computer-readable media can determine a first set of content items to be sent to a computing device of a user. A token is generated based at least in part on the first set of content items, the token being encoded with information for tracking content items sent to the computing device of the user. Data corresponding to the set of content items and the token is sent to the computing device of the user.

17 Claims, 9 Drawing Sheets

SYSTEMS AND METHODS FOR PROVIDING CONTENT

FIELD OF THE INVENTION

The present technology relates to the field of content provision. More particularly, the present technology relates to techniques for providing content to users.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine a first set of content items to be sent to a computing device of a user. A token is generated based at least in part on the first set of content items, the token being encoded with information for tracking content items sent to the computing device of the user. Data corresponding to the set of content items and the token is sent to the computing device of the user.

In some embodiments, the token is a fixed-length bit string.

In some embodiments, the systems, methods, and non-transitory computer readable media are configured to receive the token from the computing device of the user and determine that the first set of content items were sent to the computing device based at least in part on the information encoded in the token.

In some embodiments, the systems, methods, and non-transitory computer readable media are configured to determine a second set of content items to be sent to the computing device of the user based at least in part on the information encoded in the token, the second set of content items not including content items that were included in the first set of content items.

In some embodiments, the systems, methods, and non-transitory computer readable media are configured to generate an updated token based at least in part on the second set of content items, the updated token being encoded with information for tracking content items sent to the computing device of the user including both the first set of content items and the second set of content items.

In some embodiments, the systems, methods, and non-transitory computer readable media are configured to determine a set of candidate content items from which the first set of content items were determined; hash identifiers corresponding to the set of candidate content items to a first set of bins in the token; hash identifiers corresponding to the first set of content items to the first set of bins in the token; categorize each bin in the first set of bins based at least in part on the identifiers that were hashed to that bin; and encode the respective categorizations of the first set of bins in the token.

In some embodiments, the systems, methods, and non-transitory computer readable media are configured to determine that only identifiers corresponding to the set of candidate content items were hashed to a first bin in the first set of bins and categorize the first bin as a bin that corresponds to candidate content items.

In some embodiments, the systems, methods, and non-transitory computer readable media are configured to determine that only identifiers corresponding to the first set of content items were hashed to a first bin in the first set of bins and categorize the first bin as a bin that corresponds to content items that were sent to the computing device of the user.

In some embodiments, the systems, methods, and non-transitory computer readable media are configured to determine that at least one first identifier corresponding to a content item in the set of candidate content items was hashed to a first bin in the first set of bins; determine that at least one second identifier corresponding a content item in the first set of content items was also hashed to the first bin; and categorize the first bin as a bin that corresponds to both candidate content items and content items that were sent to the computing device of the user.

In some embodiments, the systems, methods, and non-transitory computer readable media are configured to hash the first identifier to a second set of bins in the token; hash the second identifier to the second set of bins in the token; categorize each bin in the second set of bins based at least in part on the identifiers that were hashed to that bin; and encode the respective categorizations of the second set of bins in the token.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
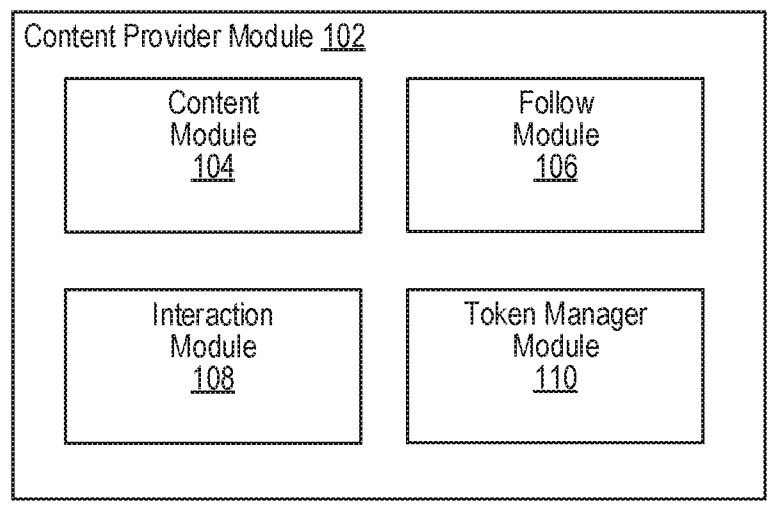
FIG. 1 illustrates an example system including an example content provider module, according to an embodiment of the present disclosure.
Figure 1:
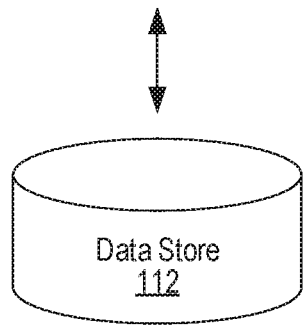

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

At any given time, a social networking system may include a large number of content items that are available to be presented to users. In such instances, content items that have already been sent to a user's computing device need to be tracked to avoid sending duplicative content items. Under conventional approaches, such tracking may be done by the user's computing device. For example, the user's computing device may track which content items have been received from the social networking system. When a new set of content items is needed, the user's computing device can send information indicating which content items have already been received from the social networking system. The social networking system can then determine a new set of content items (e.g., non-duplicative content items) to be sent to the computing device. In one example, the information provided by the computing device may include a list of content item identifiers. Each of these identifiers can be a numerical value (e.g., 32-bit integer, 64-bit integer, 128-bit integer, etc.). Consequently, the amount of data sent from the user's computing device can become exceedingly large depending on the amount of bits needed to represent a content item identifier and the number of content items being tracked. For example, the user's computing device may provide the social networking system with a list of twenty content item identifiers that have been seen by the user. If each content item identifier is represented using a 64-bit string, then the computing device will need to send twenty identifiers that are each 64-bits in length, i.e., a total of 1,280 bits of information. The list of content item identifiers being tracked will typically grow as more content items are sent to the user's computing device. Transmitting such large amounts of data between the social networking system and user computing devices can result in an inefficient use of both computing and data resources. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, content items that have been sent to a user's computing device can be tracked using a token. For example, in some embodiments, the social networking system can encode information indicating a set of content items that are being sent to a user's computing device into a token associated with the user. This token can be provided to the user's computing device along with data corresponding to the set of content items being sent. The user's computing device can send the token back to the social networking system when the computing device is ready to present another set of content items. In this example, the social networking system can identify the next set of content items to be presented to the user. The social networking system can also update the token to track this next set of content items that are being sent to the user's computing device. Again, the social networking system can provide this token to the user's computing device along with data corresponding to the next set of content items being sent. In various embodiments, this token is a fixed-length bit string that can be used to determine which content items have been sent to the user's computing device and which candidate content items are still eligible to be sent. This improved approach, therefore, helps alleviate the inefficient use of computing and data resources that typically arises in conventional approaches.

FIG. 1 illustrates an example system 100 including an example content provider module 102, according to an embodiment of the present disclosure. As shown in the example of FIG. 1, the content provider module 102 can include a content module 104, a follow module 106, an interaction module 108, and a token manager module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 112, as shown in the example system 100. The at least one data store 112 can be configured to store and maintain various types of data. For example, the data store 112 can store information describing various content items that have been posted by users of a social networking system. In some implementations, the at least one data store 112 can store information associated with the social networking system (e.g., the social networking system 630 of FIG. 6). The information associated with the social networking system can include data corresponding to content items, users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content provider module 102 can be configured to provide users with access to content that is posted through a content provider (e.g., a social networking system). For example, the content module 104 can provide content items to be presented to a first user through a software application (e.g., a social networking application, browser, etc.) running on a computing device of the first user. Such content items may include text, images, audio, and videos, for example. In some embodiments, the content module 104 identifies content items to be sent to the first user, for example, based on the first user's content preferences. In some embodiments, the identified content items may be sent to the first user's computing device in one or more sets (e.g., a set of two or more content items). For example, the software application on the first user's computing device may request a set of content items to be presented when initially launched. In this example, the content module 102 can determine a set of content items to be presented to the first user. The content module 102 can then provide this set of content items to the first user's computing device. The software application running on the first user's computing device can present the set of content items through a display screen of the computing device. Once these content items have been presented (or viewed), the software application on the first user's computing device can request another set of content items from the social networking system.

In various embodiments, other users of the social networking system can access content items posted by the first user. In one example, the other users can access the content items by searching for the first user, for example, by user name through an interface provided by a software application (e.g., a social networking application, browser, etc.) running on their respective computing devices. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that content items posted by the first user are no longer included in the content feed of the user. In some instances, the user may want to endorse, or "like", a content item. In such instances, the user can select an option provided in the interface to like the desired content item. The interaction module 108 can determine when a user likes a given content item and can store information describing this relationship. In some instances, the user may want to post a comment in response to a content item. In such instances, the user can select an option provided in the interface to enter and post the comment for the desired content item. The interaction module 108 can determine when a user posts a comment in response to a given content item and can store information describing this relationship. In some embodiments, such information can be stored in a social graph as described in reference to FIG. 6.

In various embodiments, the token manager module 110 is configured to generate respective tokens for tracking content items that have been sent (or presented) to users of the social networking system. For example, in some embodiments, when sending a set of content items to a computing device of a user, the token manager module 110 can encode a token with information that can be used to identify the content items that are being sent to the user's computing device. This token can be sent to the user's computing device along with the set of content items. A software application running on the user's computing device can store the token and present the set of content items through a display screen of the computing device. In such embodiments, once the set of content items has been presented, the software application can request another set of content items from the content provider module 102. When sending this request, the software application running on the user's computing device also sends the stored token back to the content provider module 102. The content provider module 102 can then determine another set of content items to be sent to the user's computing device. In various embodiments, when identifying content items to send to the user's computing device, the content provider module 102 can use the information encoded in the token to ensure that none of the content items being sent are duplicates of content items that had previously been sent to the user's computing device. More details regarding the token manager module 110 will be provided below in reference to FIG. 2.

Figure 2:
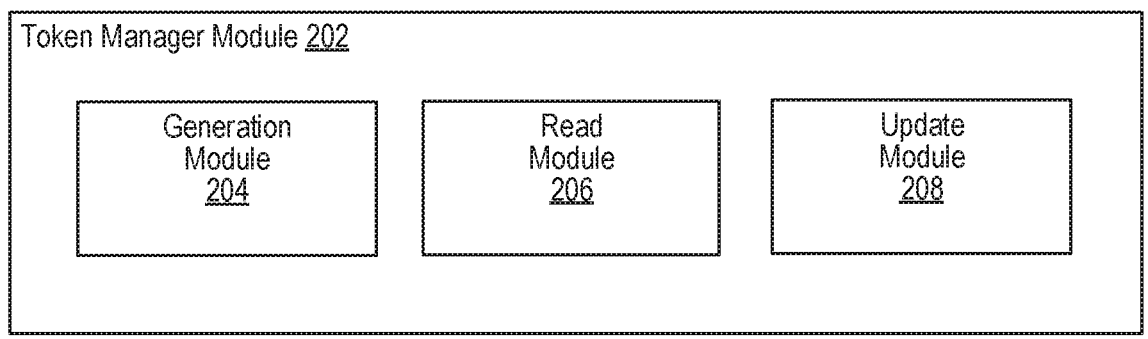
FIG. 2 illustrates an example token manager module, according to an embodiment of the present disclosure.

FIG. 2 illustrates a token manager module 202, according to an embodiment of the present disclosure. In some embodiments, the token manager module 110 of FIG. 1 can be implemented with the token manager module 202. As shown in the example of FIG. 2, the token manager module 202 can include a generation module 204, a read module 206, and an update module 208.

Initially, a user operating a computing device can launch (or access) a software application (e.g., social networking application) on the computing device. The social networking application may be configured to obtain content items from a content provider (e.g., a social networking system) and to present the content items through an interface provided by the software application. In general, each content item can be associated with a unique content item identifier (e.g., a 32-bit integer, 64-bit integer, 128-bit integer, etc.). When a set of content items are initially being sent to the user's computing device (e.g., upon launching the social networking application), the generation module 204 can generate a token that will be used to track the content items being sent to the user's computing device.

In some embodiments, the token is a fixed-length bit string that can be used to determine which content items have been sent to the user's computing device and which content items are still eligible to be sent to the user's computing device. In various embodiments, users of the social networking system are assigned their own separate tokens. In such embodiments, each token tracks the content items that have been sent to an individual user's computing device. In some embodiments, a token can be represented as a bit string of some length (e.g., 250 bits, 500 bits, 1,000 bits, etc.). Each bit in the token can represent a bin (or bucket) into which content item identifiers can be hashed. In some embodiments, each token is divided into two or more sets of bins. For example, depending on its length, a token can be divided into a first set of bins, a second set of bins, and a third set of bins. Each set of bins can be used when hashing content item identifiers during a given iteration. For example, a first set of bins can be used when hashing content item identifiers during a first iteration, a second set of bins can be used when hashing content item identifiers during a second iteration, a third set of bins can be used when hashing content item identifiers during a third iteration, and so on. In some embodiments, when allocating bins for each iteration, the generation module 204 can allocate the first half of the total number of bins in the token to the first set of bins. In such embodiments, a portion (e.g., half) of the remaining second half of the total number of bins in the token can be allocated to the second set of bins. The remaining bins in the token can similarly be allocated to subsequent sets of bins until all, or most, of the bins in the token have been allocated. For example, a token having a total of 50 bins can be divided into a first set of bins having 25 bins, a second set of bins having 12 bins, a third set of bins having 6 bins, and a fourth set of bins having 3 bins. These divisions are provided merely as examples and, depending on the implementation, a token may be divided in a number of different ways. In some embodiments, these token divisions and their respective sizes (e.g., the respective number of bins included in a set of bins) are pre-defined.

In various embodiments, when generating a token for a user, the generation module 204 can obtain a list of content item identifiers that correspond to a set of candidate content items ("candidate content item identifiers"). This set of candidate content items can include various content items that are eligible to be presented to the user. In some embodiments, the set of candidate content items (e.g., top 1,000 content items) is generated periodically (e.g., hourly, daily, etc.). In such embodiments, the token can be re-generated when the set of candidate content items is updated. The generation module 204 can also obtain a list of content item identifiers that correspond to a set of content items being sent to the user's computing device ("sent content item identifiers"). Next, the generation module 204 can hash each candidate content item identifier to a first set of bins that correspond to the token. Similarly, the generation module 204 can also hash each sent content item identifier to the first set of bins. In various embodiments, the token manager module 202 can implement any generally known hashing techniques to hash content item identifiers. Once this initial iteration of hashing is complete, the generation module 204 can categorize (or encode) each bin in the first set of bins depending on which content item identifiers were hashed to the bin. For example, in some embodiments, a bin to which only candidate content item identifiers were hashed can be categorized as "not sent". A bin to which only sent content item identifiers were hashed can be categorized as "sent". Further, a bin to which both candidate content item identifiers and sent content item identifiers were hashed can be categorized as "ambiguous". The categorization labels used herein (e.g., "not sent", "sent", "ambiguous") are provided merely as examples and, naturally, such categorizations (or states) may be encoded in the token using various approaches.

In some embodiments, content item identifiers that were hashed to a bin categorized as "ambiguous" are recursively re-hashed to one or more additional sets of bins. For example, the generation module 204 can re-hash the content item identifiers that were previously hashed to "ambiguous" bins in the first set of bins to a second set of bins in the token. The generation module 204 can categorize each bin in the second set of bins depending on which content item identifiers were hashed to that bin, as described above. For example, any bins in the second set of bins to which only candidate content item identifiers were hashed are categorized as "not sent". Any bins in the second set of bins to which only sent content item identifiers were hashed are categorized as "sent". Further, any bins in the second set of bins to which both candidate content item identifiers and sent content item identifiers were hashed are categorized as "ambiguous". Once the categorization of the second set of bins is complete, the generation module 204 can again recursively re-hash content item identifiers that were hashed to bins categorized as "ambiguous" to an additional set of bins (e.g., third set of bins in the token). This recursive re-hashing can be performed until each content item identifier ultimately hashes to a bin that has been categorized as either "not sent" or "sent". In this example, assuming no bins in the second set of bins were categorized as "ambiguous", the generation module 204 can use the first set of bins and the second set of bins, along with their respective categorizations (or encodings) to create the token that will be used to track content items that have been sent to the user. When creating the token, the generation module 204 can combine (or append) each of the sets of bins (e.g., the first set of bins, the second set of bins, etc.) that were used to hash the content item identifiers. As mentioned, the token includes information identifying each bin's categorization (or encoding). More details describing the token generation process are provided in reference to FIG. 3.

The read module 206 can be configured to read a user's token to determine which content items have been sent to the user's computing device and which content items are still eligible to be sent to the user's computing device. For example, the read module 206 can obtain the list of candidate content item identifiers that were used to generate the token, as described above. The read module 206 can then hash each candidate content item identifier to a first set of bins in the token. In this example, any content item identifiers that hash to a bin that was categorized as "not sent" will correspond to candidate content items that are still eligible to be presented to the user. Further, any content item identifiers that hash to a bin that was categorized as "sent" will correspond to content items that have already been sent to the user's computing device. In some instances, there may be content item identifiers that hash to a bin that was categorized as "ambiguous". A content item identifier that hashes to a bin that was categorized as "ambiguous" could be a candidate content item or a content item that has already been sent. To eliminate this ambiguity, in some embodiments, the read module 206 recursively re-hashes these content item identifiers to additional sets of bins. For example, the read module 206 can re-hash these "ambiguous" content item identifiers to a second set of bins in the token. Similarly, the read module 206 can determine whether a re-hashed content item identifier was "not sent", "sent", or is "ambiguous" depending on the respective categorization of the bin in the second set of bins to which the content item identifier was hashed. This recursive re-hashing can be repeated until each content item identifier ultimately hashes to a bin that has been categorized as either "not sent" or "sent".

In various embodiments, the update module 208 can be used to update (or re-generate) tokens that were generated for users. For example, the social networking system may receive a token from a user's computing device along with a request for an additional set of content items. The social networking system can read the token to determine which content items have already been sent to the user's computing device and which candidate content items are still eligible to be sent, as described above. The social networking system can then determine a new set of content items to be sent to the user's computing device. In doing so, the update module 208 can be used to update the encodings in the token to account for the new set of content items being sent. For example, in some embodiments, the update module 208 can determine a list of candidate content item identifiers that are eligible to be presented to the user. The update module 208 can also determine a list of sent content item identifiers which include content items that have already been sent to the user's computing device and content items being sent (e.g., the new set of content items) to the user's computing device. These content item identifiers can be hashed to one or more sets of bins in the token and the respective categorizations (or encodings) of these bins can be updated using the approaches as described in reference to the generation module 204. Once the bin categorizations (or encodings) have been updated, the updated token can be used to identify the previously sent content items as well as the content items included in the new set of content items being sent to the user's computing device.

Figure 3:
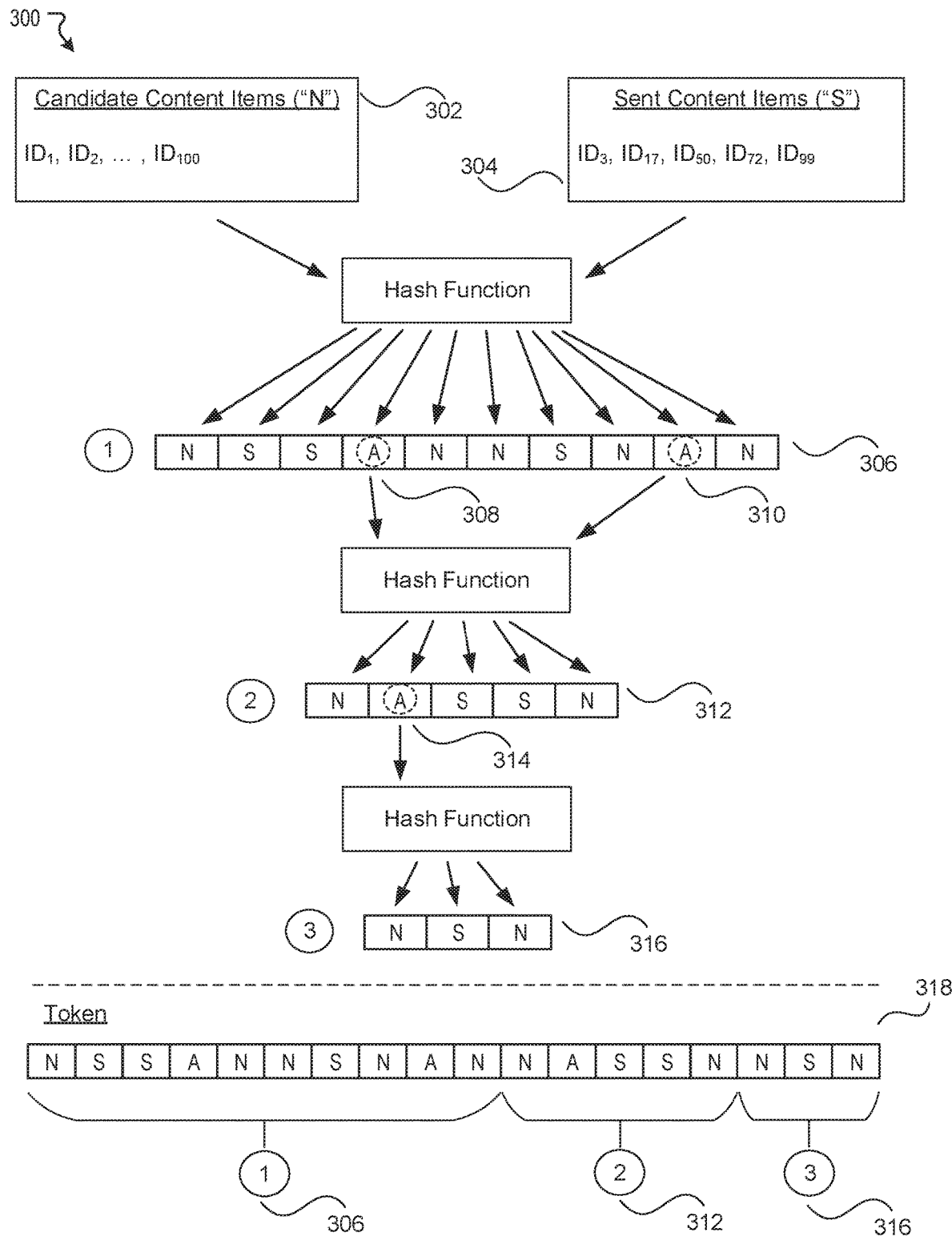
FIG. 3 illustrates an example diagram for generating a token, according to an embodiment of the present disclosure.

FIG. 3 illustrates an example diagram 300 for generating a token 318, according to an embodiment of the present disclosure. When generating the token 318, a first list of content item identifiers 302 corresponding to a set of candidate content items is obtained. Further, a second list of content item identifiers 304 corresponding to a set of content items being sent to the user's computing device is also obtained. Each content item identifier in the first list 302 can be hashed to a first set of bins 306 corresponding to the token 318. Similarly, each identifier in the second list 304 can also be hashed to the first set of bins 306. Next, each bin in the first set of bins 306 is categorized (or encoded) based on the content item identifiers that were hashed to the bin. For example, a bin to which only candidate content item identifiers were hashed (e.g., from the first list 302) can be categorized as "not sent". Such bins are denoted in FIG. 3 using the letter "N". A bin to which only sent content item identifiers were hashed (e.g., from the second list 304) can be categorized as "sent". Such bins are denoted in FIG. 3 using the letter "S". Further, a bin in which identifiers from both the first list 302 and the second list 304 were hashed can be categorized as "ambiguous". Such bins are denoted in FIG. 3 using the letter "A". These categorization labels (e.g., "N", "S", etc.) are provided merely as examples and, naturally, such categorizations (or states) may be stored in the token using various approaches.

As mentioned, a content item identifier that hashes to a bin that was categorized as "ambiguous" (or "A") could correspond to a candidate content item or a content item that has already been sent to the user's computing device. To eliminate this ambiguity, in some embodiments, content item identifiers that were hashed to "ambiguous" bins are recursively re-hashed to one or more additional set of bins, e.g., a second set of bins 312. For example, as illustrated in the example of FIG. 3, the first set of bins 306 includes a first bin 308 and a second bin 310 that were both categorized as "ambiguous". In this example, content item identifiers that were hashed to the first bin 308 are re-hashed to the second set of bins 312. Similarly, content item identifiers that were hashed to the second bin 310 are re-hashed to the second set of bins 312. Once this re-hashing is complete, each bin in the second set of bins 312 can be categorized (or encoded), as described above. Again, any content item identifiers hashed to bins that were categorized as being "ambiguous" (or "A") are re-hashed to another set of bins, e.g., a third set of bins 316. In FIG. 3, the second set of bins 312 includes one bin 314 that was categorized as "ambiguous" (or "A"). In this example, content item identifiers that were hashed to the bin 314 are re-hashed to the third set of bins 316. Once this re-hashing is complete, each bin in the third set of bins 316 can be categorized (or encoded), as described above. In this example, no more content item identifiers need to be re-hashed since none of the bins in the third set 316 have been categorized as being "ambiguous" (or "A"). At this point, the token 318 that will be used to track the content items can be created. In some embodiments, when creating the token, each of the sets of bins that were used to hash the content item identifiers can be combined (or appended). As illustrated in FIG. 3, the token 318 is created by combining the first set of bins 306, the second set of bins 312, and the third set of bins 316.

Figure 4A:
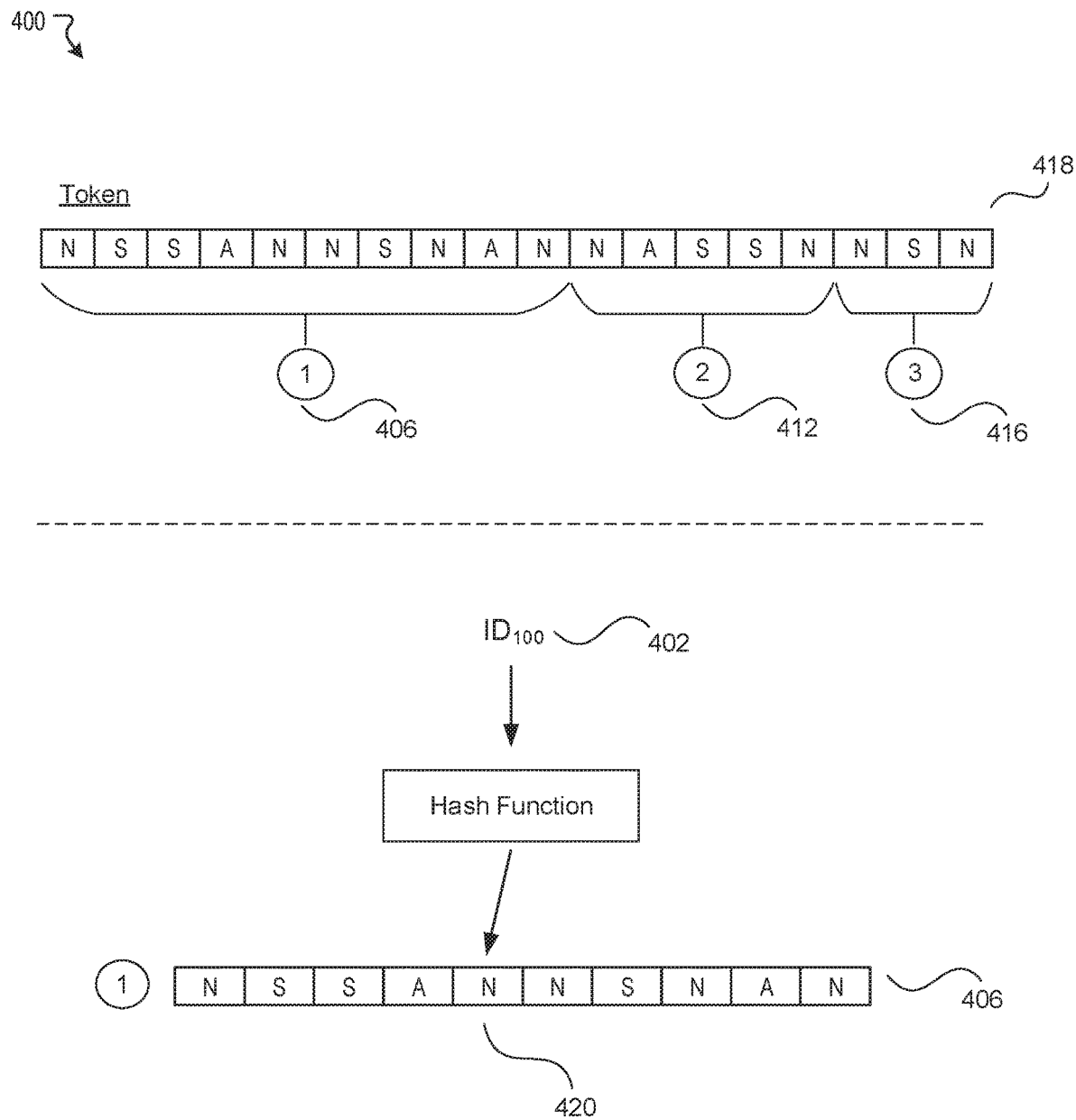
FIGS. 4A-C illustrate example diagrams for reading a token, according to an embodiment of the present disclosure.
Figure 4B:
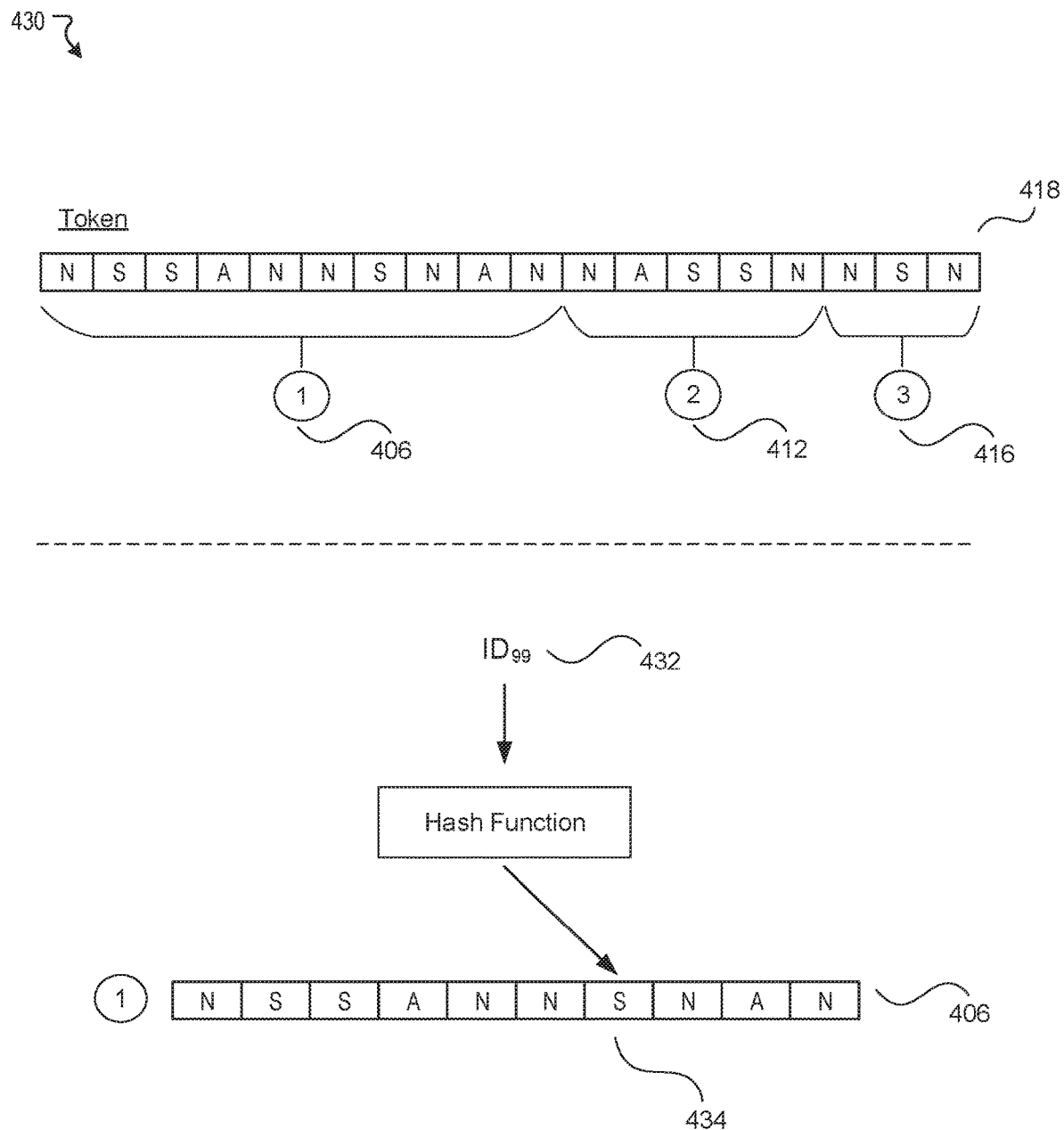
Figure 4C:
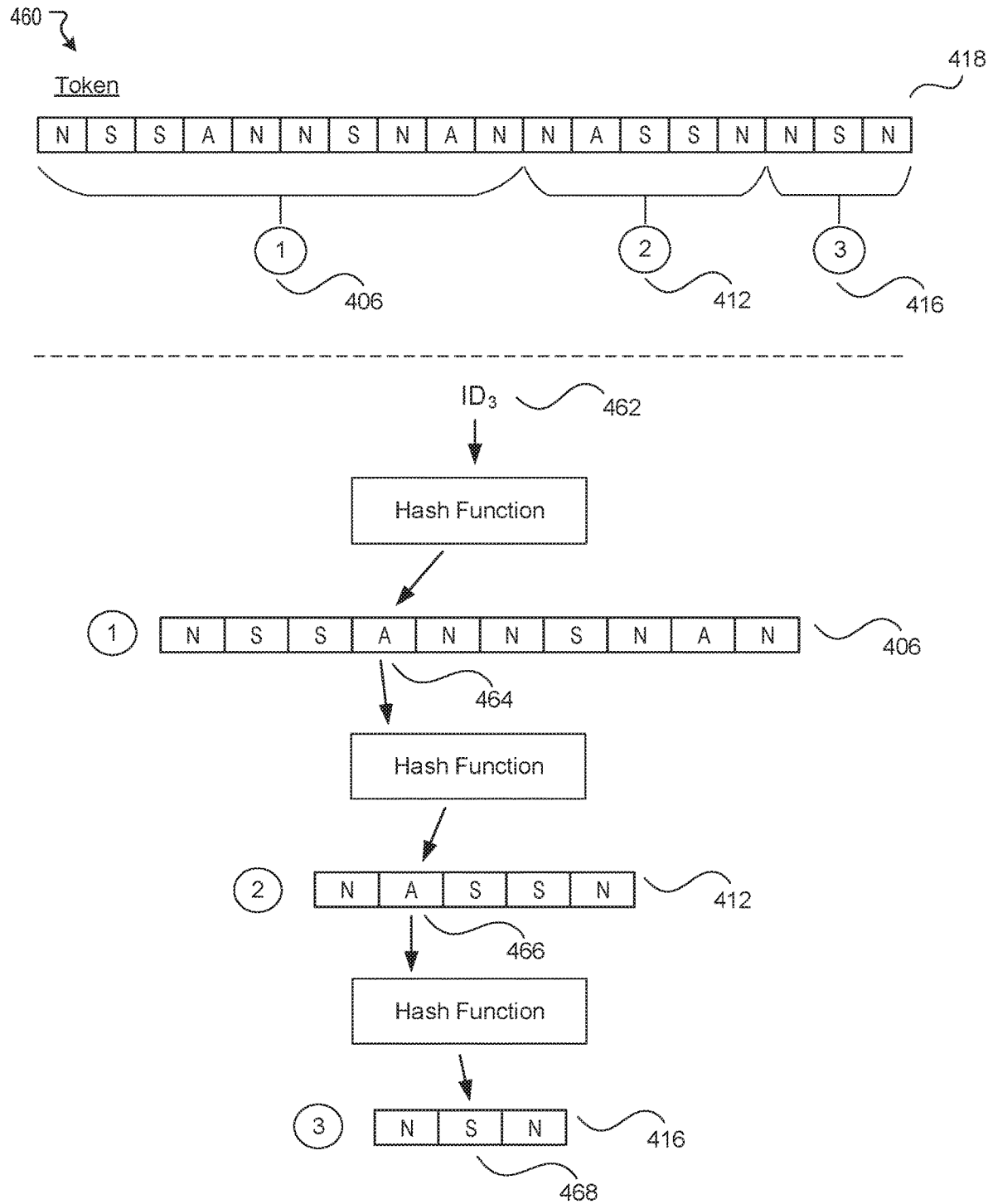

FIGS. 4A-C illustrate example diagrams for reading a token. FIG. 4A illustrates an example 400 in which a user's token 418 is being used to determine whether a content item has already been sent to the user. As shown, the token 418 includes a number of bins and each bin has been categorized (or encoded) using the approaches described above. In this example, the token 418 includes a first set of bins 406, a second set of bins 412, and a third set of bins 416. As mentioned, each set of bins can iteratively be utilized for hashing content item identifiers. Here, the first set of bins 406 can be used to hash content item identifiers during a first iteration, the second set of bins 412 can be used during a second iteration, and the third set of bins 416 can be used during a third iteration. In the example of FIG. 4A, a content item identifier 402 that references a content item is hashed to the first set of bins 406. As shown, the content item identifier 402 was hashed to a bin 420 that was previously categorized (or encoded) as "not sent" (or "N"). Based on this categorization, a determination can be made that the content item to which the content item identifier 402 corresponds has not yet been sent to this user.

FIG. 4B illustrates another example 430 in which the user's token 418 is being used to determine whether a content item has already been sent to the user. In the example of FIG. 4B, a content item identifier 432 that references a content item is hashed to the first set of bins 406. As shown, the content item identifier 432 was hashed to a bin 434 that was previously categorized (or encoded) as "sent" (or "S"). Based on this categorization, a determination can be made that the content item to which the identifier 432 corresponds has already been sent to this user.

FIG. 4C illustrates another example 460 in which the user's token 418 is being used to determine whether a content item has already been sent to the user. In the example of FIG. 4C, a content item identifier 462 that references a content item is hashed to the first set of bins 406. As shown, the content item identifier 462 hashes to a bin 464 that was previously categorized (or encoded) as "ambiguous" (or "A"). Since this categorization does not definitely answer whether the content item was or was not sent to the user, another iteration of hashing is performed using the second set of bins 412. As shown, the content item identifier 462 is re-hashed to a bin 466 in the second set of bins 412. Here, the content item identifier 462 was re-hashed to a bin 466 that was previously categorized (or encoded) as "ambiguous" (or "A"). Again, this categorization does not definitely answer whether the content item was or was not sent to the user. As a result, another iteration of hashing is performed using the third set of bins 416. In the third iteration, the identifier 462 is re-hashed to a bin 468 in the third set of bins 416. In this example, the bin 468 was previously categorized (or encoded) as "sent" (or "S"). Based on this categorization, a determination can be made that the content item to which the content item identifier 462 corresponds has already been sent to this user. While this example describes three iterations of hashing using the first set of bins 406, the second set of bins 412, and the third set of bins 416, there may be additional sets of bins allocated in the token 418 (depending on the length of the token 418) and these additional sets of bins may be used in subsequent iterations, as needed, to determine whether a content item was sent to the user's computing device.

Figure 5:
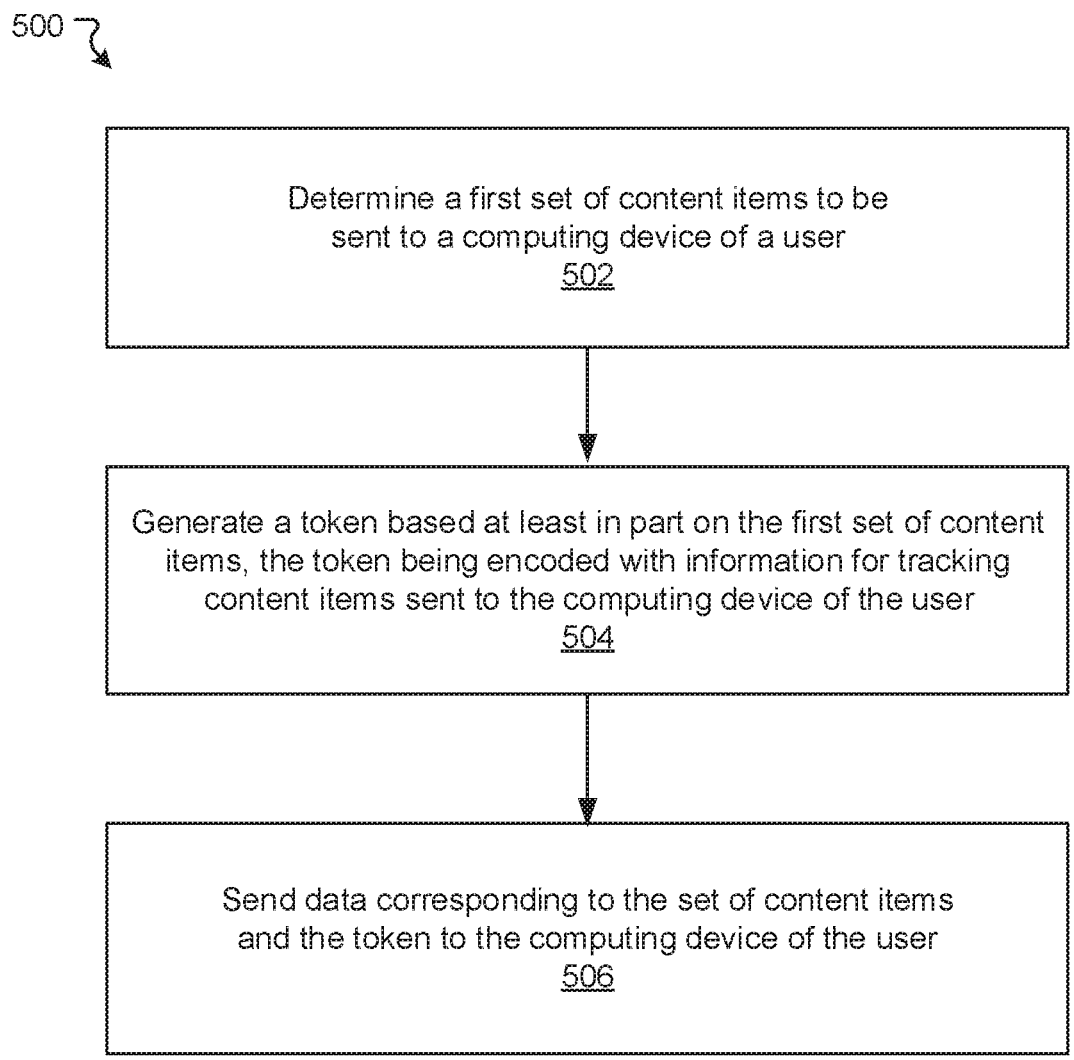
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a first set of content items to be sent to a computing device of a user is determined. At block 504, a token is generated based at least in part on the first set of content items. The token is encoded with information for tracking content items sent to the computing device of the user. At block 506, data corresponding to the set of content items and the token is sent to the computing device of the user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
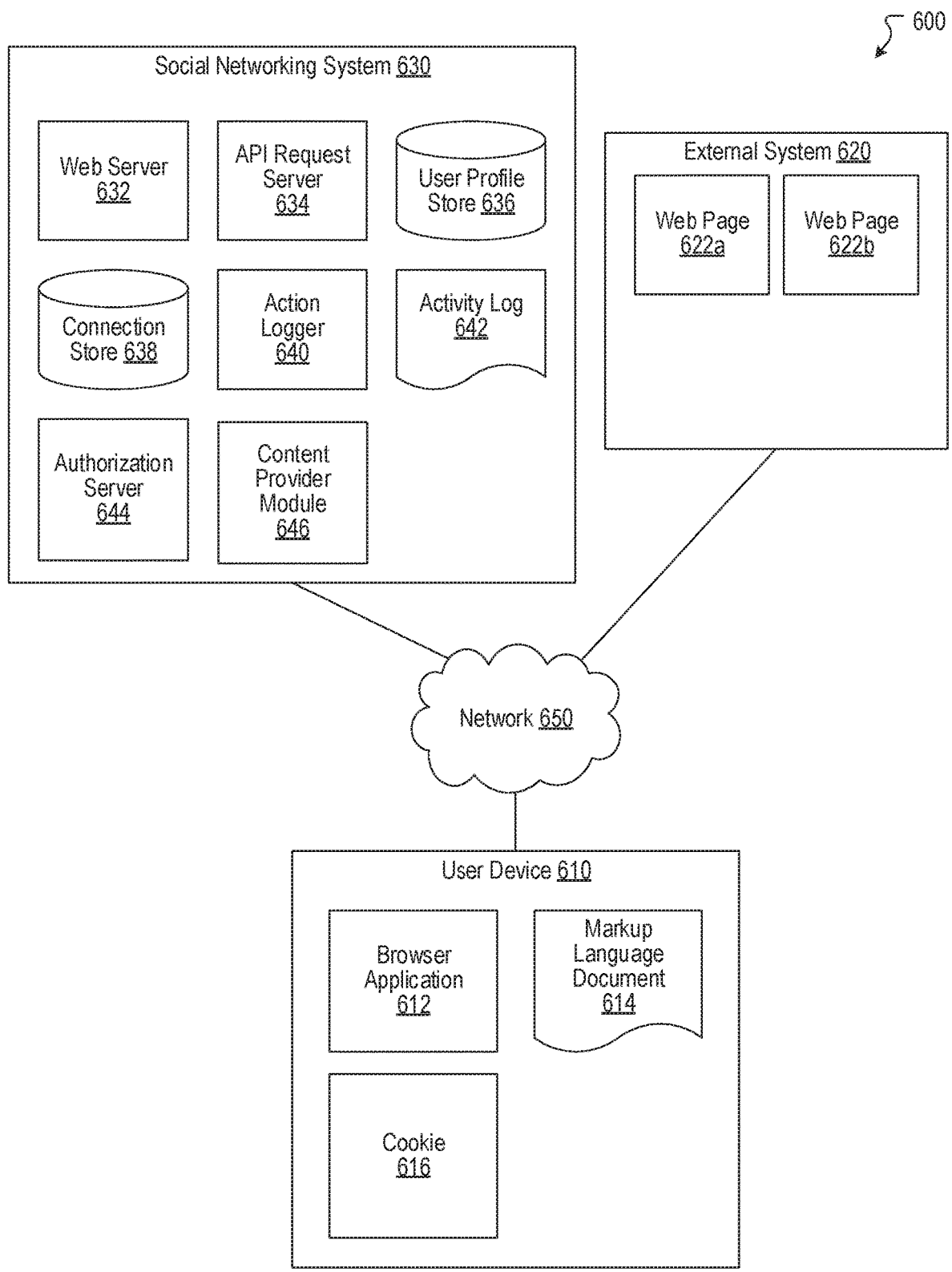
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. As discussed previously, it should be appreciated that there can be many variations or other possibilities.

Hardware Implementation

Figure 7:
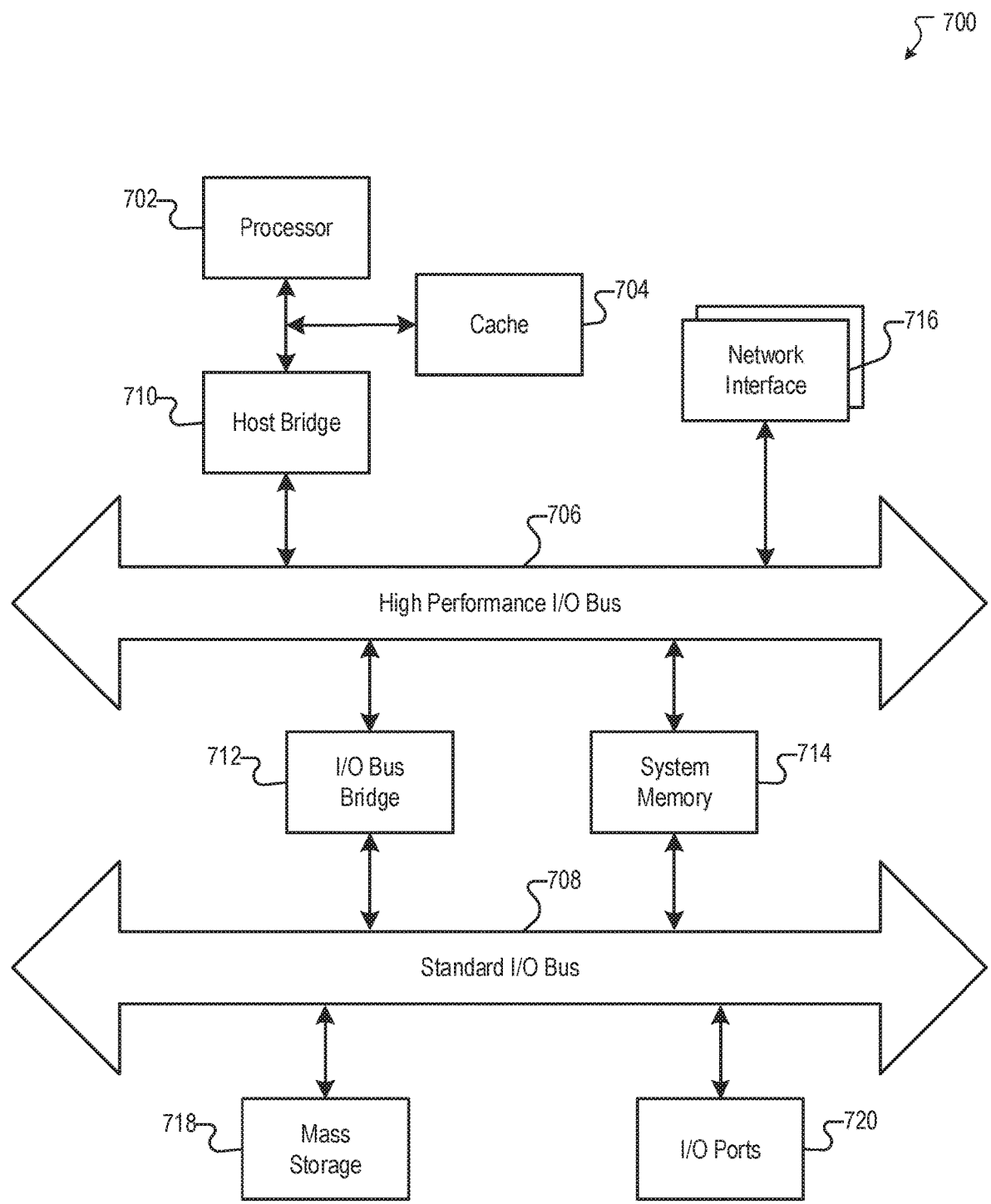
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a first set of content items to be sent to a computing device of a user;
   generating, by the computing system, a token based at least in part on the first set of content items, wherein the token is a fixed-length bit string, the token being encoded with information for tracking content items sent to the computing device of the user, the generating further comprising:
      determining, by the computing system, a set of candidate content items from which the first set of content items were determined;
      hashing, by the computing system, identifiers corresponding to the set of candidate content items to a first set of bins associated with the token;
      hashing, by the computing system, identifiers corresponding to the first set of content items to the first set of bins associated with the token; and
   sending, by the computing system, data corresponding to the first set of content items and the token to the computing device of the user.

2. The computer-implemented method of claim 1, the method further comprising:
   receiving, by the computing system, the token from the computing device of the user; and
   determining, by the computing system, that the first set of content items were sent to the computing device based at least in part on the information encoded in the token.

3. The computer-implemented method of claim 2, the method further comprising:
   determining, by the computing system, a second set of content items to be sent to the computing device of the user based at least in part on the information encoded in the token, the second set of content items not including content items that were included in the first set of content items.

4. The computer-implemented method of claim 3, the method further comprising:
   generating, by the computing system, an updated token based at least in part on the second set of content items, the updated token being encoded with information for tracking content items sent to the computing device of the user including both the first set of content items and the second set of content items.

5. The computer-implemented method of claim 1, wherein generating the token based at least in part on the first set of content items further comprises:
   categorizing, by the computing system, each bin in the first set of bins based at least in part on the identifiers that were hashed to that bin; and
   encoding, by the computing system, the respective categorizations of the first set of bins in the token.

6. The computer-implemented method of claim 5, wherein categorizing each bin in the first set of bins further comprises:
   determining, by the computing system, that only identifiers corresponding to the set of candidate content items were hashed to a first bin in the first set of bins; and
   categorizing, by the computing system, the first bin as a bin that corresponds to candidate content items.

7. The computer-implemented method of claim 5, wherein categorizing each bin in the first set of bins further comprises:
   determining, by the computing system, that only identifiers corresponding to the first set of content items were hashed to a first bin in the first set of bins; and
   categorizing, by the computing system, the first bin as a bin that corresponds to content items that were sent to the computing device of the user.

8. The computer-implemented method of claim 5, wherein categorizing each bin in the first set of bins further comprises:
   determining, by the computing system, that at least one first identifier corresponding to a content item in the set of candidate content items was hashed to a first bin in the first set of bins;
   determining, by the computing system, that at least one second identifier corresponding a content item in the first set of content items was also hashed to the first bin; and
   categorizing, by the computing system, the first bin as a bin that corresponds to both candidate content items and content items that were sent to the computing device of the user.

9. The computer-implemented method of claim 8, the method further comprising:
   hashing, by the computing system, the first identifier to a second set of bins in the token;

hashing, by the computing system, the second identifier to the second set of bins in the token;

categorizing, by the computing system, each bin in the second set of bins based at least in part on the identifiers that were hashed to that bin; and encoding, by the computing system, the respective categorizations of the second set of bins in the token.

10. A system comprising:

at least one processor; and a memory storing instructions that, when executed by the at least one processor, cause the system to perform:

determining a first set of content items to be sent to a computing device of a user;

generating a token based at least in part on the first set of content items, wherein the token is a fixed-length bit string, the token being encoded with information for tracking content items sent to the computing device of the user, the generating further comprising:

determining a set of candidate content items from which the first set of content items were determined;

hashing identifiers corresponding to the set of candidate content items to a first set of bins associated with the token;

hashing identifiers corresponding to the first set of content items to the first set of bins associated with the token; and sending data corresponding to the first set of content items and the token to the computing device of the user.

11. The system of claim 10, wherein the instructions further cause the system to perform:

receiving the token from the computing device of the user; and determining that the first set of content items were sent to the computing device based at least in part on the information encoded in the token.

12. The system of claim 11, wherein the instructions further cause the system to perform:

determining a second set of content items to be sent to the computing device of the user based at least in part on the information encoded in the token, the second set of content items not including content items that were included in the first set of content items.

13. The system of claim 12, wherein the instructions further cause the system to perform:

generating an updated token based at least in part on the second set of content items, the updated token being encoded with information for tracking content items sent to the computing device of the user including both the first set of content items and the second set of content items.

14. A non-transitory computer-readable storage medium including instructions that, when executed by at least one processor of a computing system, cause the computing system to perform a method comprising:

determining a first set of content items to be sent to a computing device of a user;

generating a token based at least in part on the first set of content items, wherein the token is a fixed-length bit string, the token being encoded with information for tracking content items sent to the computing device of the user, the generating further comprising:

determining a set of candidate content items from which the first set of content items were determined;

hashing identifiers corresponding to the set of candidate content items to a first set of bins associated with the token;

hashing identifiers corresponding to the first set of content items to the first set of bins associated with the token; and sending data corresponding to the first set of content items and the token to the computing device of the user.

15. The non-transitory computer-readable storage medium of claim 14, wherein the instructions further cause the system to perform:

receiving the token from the computing device of the user; and determining that the first set of content items were sent to the computing device based at least in part on the information encoded in the token.

16. The non-transitory computer-readable storage medium of claim 15, wherein the instructions further cause the system to perform:

determining a second set of content items to be sent to the computing device of the user based at least in part on the information encoded in the token, the second set of content items not including content items that were included in the first set of content items.

17. The non-transitory computer-readable storage medium of claim 16, wherein the instructions further cause the system to perform:

generating an updated token based at least in part on the second set of content items, the updated token being encoded with information for tracking content items sent to the computing device of the user including both the first set of content items and the second set of content items.

* * * * *